United States Patent Office 3,558,649
Patented Jan. 26, 1971

3,558,649
2-(AMINOALKYL)-1-PHENYLISOINDOLINES
Werner Metlesics, Clifton, and Leo Henryk Sternbach, Upper Montclair, N.J., assignors to Hoffmann-La Roche Inc., Nutley, N.J., a corporation of New Jersey
No Drawing. Continuation-in-part of application Ser. No. 487,619, Sept. 15, 1965. This application Jan. 30, 1967, Ser. No. 612,321
Int. Cl. C07d 27/48
U.S. Cl. 260—326.1                                26 Claims

ABSTRACT OF THE DISCLOSURE

Novel 1 - phenyl - 2 - aminoalkylisoindoline derivatives have been prepared and shown to exhibit useful anorexigenic properties.

---

This application is a continuation-in-part of application Ser. No. 487,619, filed Sept. 15, 1965 and now abandoned.

BRIEF SUMMARY OF THE INVENTION

This invention relates to novel isoindoline derivatives and to novel intermediates useful in the preparation thereof. More particularly, the invention relates to 1-phenyl-2-aminoalkylisoindoline derivatives of the formula:

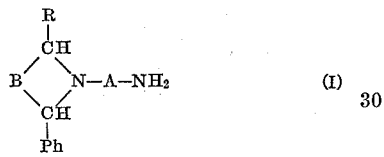

(I)

wherein B represents o-phenylene or o-phenylene in which one or more of the hydrogen atoms have been replaced by a halogen atom, i.e., chlorine, bromine or fluorine, lower alkyl, lower alkoxy, hydroxy, amino, or trifluoromethyl; Ph represents phenyl or phenyl in which one or more of the hydrogen atoms have been replaced by a halogen atom, i.e., chlorine, bromine or fluorine, lower alkyl, lower alkoxy, hydroxy, amino, or trifluoromethyl; A represents a straight or branched chain alkylene group containing from 2 to 12 carbon atoms in the chain and such alkylene groups in which part or all of the carbon atoms are in the form of a carbocycle of 3 to 7 carbon atoms; and R represents hydrogen or lower alkyl and pharmacetically acceptable acid addition salts thereof.

DETAILED DESCRIPTION

In one aspect of this invention, the novel compounds of Formula I above are prepared by treating a diester of the formula:

(II)

wherein X is halogen, preferably chlorine, iodine or bromine, or other similar leaving group such as mesyl or tosyl; and B, R, and Ph have the same significance as hereinabove with an alkylenediamine of the formula:

$$NH_2—A—NH_2 \quad (III)$$

wherein A has the same significance as hereinabove.

The alkylenediamines of Formula III are known compounds or compounds which can be readily prepared in analogy to the preparation of known compounds. Among the known alkylenediamines which can be employed in the preparation of the novel compounds of Formula I above, there can be named, for example, α,ω-diaminoalkanes such as 1,2-diaminoethane, 1,3-diaminopropane, 1,4-diaminobutane, 1,10-diaminodecane, 1,11-diaminoundecane, 1,12-diaminododecane, etc., or amines such as 1,2-diamino-2-methylpropane, 1,3 - diamino-2-methylpropane, 1,3-diaminobutane, 2,3-diaminobutane, 1,2-diaminobutane, 2,5-diaminohexane, 1,2-diaminocyclohexane, 1,3-diaminocyclohexane, 1,4-diaminocyclohexane, and the like. Ethylenediamine is especially preferred.

The reaction with diamine is conveniently carried out by adding the diester of Formula II to the diamine at room temperature. Preferably, there is employed a large molar excess of diamine. The reaction can also be carried out at temperatures above or below room temperature, although for practical reasons, it is preferred to operate at a temperature between about 0° C. and 100° C. The reaction is suitably carried out in the presence of an inert organic solvent, such as, for example, benzene, methylene chloride, ether, tetrahydrofuran, and the like; or, in the case where either or both of the reactants are liquid under the conditions employed in the reaction, the reaction is conveniently carried out in the absence of a solvent.

The diesters of Formula II employed as starting materials in the reaction are readily obtainable from the corresponding diols of the formula:

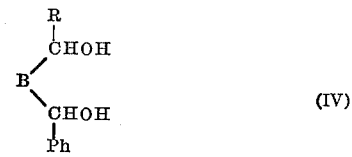

(IV)

wherein R, B, and Ph have the same meaning as hereinabove by the usual techniques for esterification, e.g., treating the diol with one of the ordinary esterifying agents such as a halo acid, acyl halides such as phosphorous halide, thionyl halide, tosyl halide, etc. The 2-hydroxymethylbenzhydrol starting material is a known compound which is readily prepared from the benzoylbenzoic acid by reduction with lithium aluminum hydride. Other diols of Formula IV which are per se novel can be readily prepared by analogous procedures starting with the appropriately substituted benzoylbenzoic acid. Suitable diols of Formula IV prepared in this manner are, for example, 5-chloro - 2 - hydroxymethylbenzhydrol, 4'-chloro-2-hydroxymethylbenzhydro, 4' - fluoro-2-hydroxymethylbenzhydrol, 4'-methoxy-2-hydroxymethylbenzhydrol, 2',5-dichloro-2-hydroxymethylbenzhydrol, 2-(1 - hydroxyethyl)-benzhydrol, 4,5-dichloro - 2 - hydroxymethylbenzhydrol, 2',4'-dichloro - 2 - hydroxymethylbenzhydrol, 4-methyl-2 - hydroxymethylbenzhydrol, 3' - trifluoromethyl-2-hydroxymethylbenzhydrol, 4-trifluoromethyl - 2 - hydroxymethylbenzhydrol, 5-methoxy - 2 - hydroxymethylbenzhydrol, etc.

In another aspect of this invention, the novel isoindoline derivatives of Formula I are prepared by condensing a diester of Formula II with an alkanolamine of the formula:

$$NH_2—A—OH \quad (V)$$

wherein A has the same meaning as hereinabove to give the corresponding 2-hydroxyalkylisoindoline derivatives of the formula:

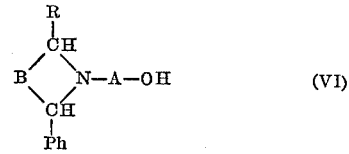

(VI)

wherein A, B, R and Ph have the same meaning as hereinabove which can, in turn, be converted to the novel end products of Formula I by esterifying to form a compound of the formula:

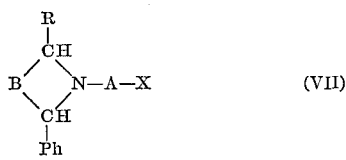

wherein A, B, R and Ph have the same meaning as hereinabove and X has the same meaning as above and is preferably bromine, iodine or chlorine followed by amination.

The 2-hydroxyalkylisoindoline derivatives of Formula VI are prepared by treating the appropriate diester of Formula II with an aminoalkanol. The reaction is suitably carried out in the presence of an inert organic solvent at about room temperature. Higher or lower temperatures such as temperatures between about 0° C. and about 100° C. can also be employed. Suitable solvents for the reaction are the inert organic solvents such as benzene, ethers, ethyl acetate, methylene chloride, and the like.

Halogenation of the 2-hydroxyalkylisoindolines of Formula VI is readily accomplished by any of the usual techniques for halogenation, e.g., by reacting with hydrohalic acids, such as hydrobromic acid. Alternatively, the 2-haloalkylisoindoline derivatives of Formula VII can be obtained directly by reacting a haloalkylamine of the formula:

$$NH_2-A-X \qquad (VIII)$$

wherein A and X have the same meaning as hereinabove with the appropriate diester of Formula II.

The reaction is conveniently carried out in the presence of an inert organic solvent at about room temperature.

Amination of the intermediates of Formula VII can be readily accomplished by adding the appropriate ester intermediate of Formula VII to a solution of ammonia in an organic solvent. Any organic solvent which is inert under the conditions employed in the reaction can be utilized. Suitable solvents are, for example, tetrahydrofuran, dimethylformamide, dichloromethane, and hydrocarbon solvents, such as benzene, etc. The reaction is readily carried out at a temperature range between about −35° C. and about 200° C. Where the higher temperatures, e.g., temperatures above room temperature, are used, corresponding pressures must, of course, be employed, and the reaction is carried out in a sealed vessel.

In a particularly preferred embodiment, this invention comprises compounds within the group defined by Formula I which are specifically represented by the formula:

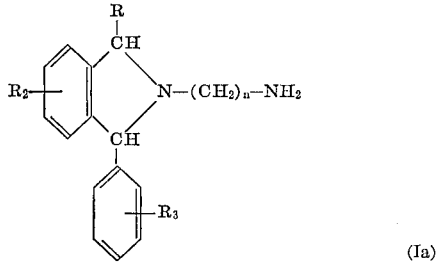

wherein R is hydrogen or lower alkyl; $R_2$ and $R_3$ are each individually selected from the group consisting of hydrogen, halogen or lower alkoxy; and $n$ is an integer from 2 to 4.

The preferred intermediates of Formulae VI and VII are those corresponding to the end products of Formula Ia.

Suitable salts of the compounds of Formula I are prepared from nontoxic organic and inorganic acids. Suitable organic acids are, for example, maleic acid, fumaric acid, ascorbic acid, tartaric acid, salicylic acid, succinic acid, citric acid, and the like. Suitable norganic acids are, for example, the hydrohalic acids, i.e., hydrochloric acid, hydrobromic acid, sulfuric acid, sulfamic acid, phosphoric acid, etc. The acid addition salts are readily prepared by the usual techniques for the preparation of acid addition salts which are readily apparent to those skilled in the art.

The novel end products of Formula I are obtained as stereoisomers. It is intended to include in this invention all of the stereoismeric forms of the compounds of Formula I whether they are obtained as racemic mixtures or as the separated optically active antipodes.

The novel compounds of this invention, i.e., the compounds of Formula I, are useful as anorexigenic agents. These compounds have also exhibited marked activity in the inhibition of ptoses induced by tetrabenazine in experimental animals. More particularly, the novel compounds of this invention are therapeutically useful as appetite suppressants in the treatment of overweight subjects.

The novel isoindoline derivatives of this invention can be administered via an oral or parenteral route. The preferred route of administration, however, is orally. The dosage amount and formulation can be varied depending upon the individual response to treatment and the period and interval during which administration is carried out. The novel compounds of this invention can be administered either alone or in combination with a pharmaceutically acceptable carrier. They can be formulated into a wide variety of dosage forms using either the bases or their pharmaceutically acceptable acid addition salts. For purposes of oral administration, they may be combined with various pharmaceutically acceptable inert carriers in the form of tablets, capsules, lozenges, troches, elixirs, syrups, and the like. Suitable carriers include solid diluents or fillers, liquid media and various nontoxic organic solvents as, for example, sodium citrate, calcium carbonate, starch, gelatin, magnesium stearate, talc, polyethylene glycols, water, glycerine and the like.

The invention will be more fully understood from the examples which follow. These examples are illustrative of the invention and are not to be construed as limitative thereof. All melting points are in degrees centigrade.

EXAMPLE 1

Preparation of 2-(2-aminoethyl)-1-phenylisoindoline and 2-(2-aminoethyl) - 1 - (p-chlorophenyl)isoindoline and salts The compounds of this invention were prepared according to the following general procedure: A soultion of an appropriate 2-hydroxymethylbenzhydrol was dissolved in an excess of thionyl chloride. The solution was kept on a steam bath for about 30 minutes after which time the excess of thionyl chloride was removed in vacuo and the residue was distilled at 0.1 mm. and at a bath temperature ranging from about 100° to 150°. A colorless oil was obtained which was dissolved in an inert solvent (benzene, methylene chloride, ether, tetrahydrofuran, etc.) and added in small portions to a stirred excess of the corresponding diamine. The mixture was kept on a steam bath for about 30 minutes after which time the solvent as well as the excess of the diamine were removed in vacuo. The residue was dissolved in ether or any water immiscible organic solvent and the solution was washed with water, dried with sodium sulfate and evaporated on a steam bath. The residue was distilled at 0.1 mm. and bath temperatures ranging from 100–170° to give the 1-phenyl-2-aminoalkylisoindoline end products as colorless oils. These compounds either crystallized on standing or were characterized in the form of their crystalline salts. In this way there were prepared the following: 2-(2-aminoethyl)-1-phenylisoindoline, white prisms, M.P. 53°; 2-(2-aminoethyl)-1-phenylisoindoline dihydrochloride, white needles, M.P. 215–220° (dec.); 2-(2-aminoethyl)-1-(p-chlorophenyl)isoindoline, colorless oil, B.P. 0.1 mm. about 125°

(bath temperature); 2-(2-aminoethyl) - 1 - (p-chlorophenyl)isoindoline monohydrochloride, white needles, M.P. 218–221°.

EXAMPLE 2

Preparation of 2-(2-aminoethyl)-1-phenylisoindoline and various salts

A solution of 127 g. (0.59 mole) of 2-hydroxymethylbenzhydrol was dissolved in 900 ml. of benzene, 80 g. of anhydrous magnesium sulfate was added and the mixture was cooled in an ice bath. Hydrogen bromide was bubbled into the stirred solution until saturation which took about 30 minutes. During this time the temperature of the solution was kept at 15–18°. The ice bath was removed and the temperature was allowed to rise to 35° in the course of 1 hour. The mixture was heated for another hour at 40–45° on a steam bath. During the whole time hydrogen bromide was passed into the solution to keep it saturated. The mixture was filtered and the solution was concentrated in vacuo to give a red oil which was dissolved in 200 ml. of benzene and added to 342 g. (5.7 mole) of ethylenediamine in the course of 15 minutes. during the addition the mixture was stirred and cooled to maintain a temperature of ca. 40°. The mixture was stirred at 25° for 70 minutes. Two layers were obtained and separated. The benzene layer was washed with water and concentrated in vacuo. The residual oil was dissolved in 250 ml. of ether. This solution was extracted twice with 300 ml. of cold 1 N hydrochloric acid. The acidic aqueous phase was made alkaline with aqueous sodium hydroxide and extracted with 350 ml. of ether. The ethereal solution was washed with 250 ml. of water, dried and concentrated. The residue was an amber oil which crystallized on scratching. This material melted up to ca. 45° and was used for the preparation of the salts described below.

(a) Dihydrochloride.—The 2 - (2 - aminoethyl)-1-phenylisoindoline obtained as above was dissolved in methanol and an excess of ethereal hydrogen chloride was added. The crystalline precipitate was collected and recrystallized from a mixture of methanol, tetrahydrofuran and ether to give the dihydrochloride as white needles melting at 215–220° (dec.).

(b) Sulfate.—A solution of 75.1 g. (0.315 mole) of 2-(2-aminoethyl)-1-phenylisoindoline in 325 ml. of ethanol and 25 ml. of isopropyl alcohol was cooled to 18°. Aqueous sulfuric acid prepared from 17 ml. of concentrated sulfuric acid and 60 ml. of water was brought to 18° and added to the cooled solution of 2-(2-aminoethyl)-1-phenylisoindoline. The temperature was maintained at 15°, 200 ml. of isopropyl alcohol was added and the crystalline precipitate was collected after 30 minutes and washed with three 75 ml. portions of isopropyl alcohol. The crystalline precipitate was dissolved in 275 ml. of water and filtered, 1000 ml. of isopropyl alcohol was added and after standing for 1½ hours the crystalline material was collected. This procedure was repeated using 275 ml. of water and 1000 ml. of isopropanol. A third recrystallization using 240 ml. of water and 1000 ml. of isopropyl alcohol gave white needles which were dried at 80° over silica gel for 16 hours to give crystals melting at 159–163° (dec.).

(c) Maleate.—To a solution of 23.8 g. (0.1 mole) of 2-(2-aminoethyl)-1-phenylisoindoline in 50 ml. of ethanol was added 11.6 g. (0.1 mole) of maleic acid in 25 ml. of methanol. Ether was added and the crystalline precipitate was collected. Recrystallizing four times from mixtures of methanol and ether gave white prisms melting at 188–191° (dec.).

(d) Cyclohexylsulfamate.—To a solution of 3.4 g. (0.015 mole) of 2-(2-aminoethyl)-1-phenylisoindoline in 5 ml. of ethanol and 20 ml. of chloroform there was added a solution of 2.6 g. (0.014 mole) of cyclohexylsulfamic acid in 10 ml. of methanol. Ether was added and the crystalline precipitate was collected. Two recrystallizations from mixtures of methanol, chloroform and ether gave white prisms melting at 136–141° (dec.).

EXAMPLE 3

Resolution of enantiomers (a) (+) 2-(2-aminoethyl) - 1 - phenylisoindoline.—A solution of 12.5 g. (0.035 mole) of (−) dibenzoyl-D-tartaric acid ($[\alpha]_D^{25} = -103.9°$ [methanol]) in 15 ml. of methanol was added to a solution of 8.3 g. (0.035 mole) of 2-(2-aminoethyl)-1-phenylisoindoline in 10 ml. of methanol. On addition of 150 ml. of ethyl acetate and 25 ml. of ether a crystalline precipitate formed which was collected and washed with chloroform. Recrystallization from a mixture of methanol and ethyl acetate gave 6 g. of a material with $[\alpha]_D^{26} = -20.5°$ (in methanol). Six recrystallizations from mixtures of methanol, ethyl acetate and ether gave 2.4 g. of white prisms melting at 167–171° (dec.). $[\alpha]_D^{25} = -7.3°$ (methanol). The base was freed with aqueous sodium hydroxide, extracted with ether and distilled in a bulb tube at 0.1 mm. (bath temperature 95–115°). A colorless oil was obtained which crystallized to give white prisms melting at 68–71° $[\alpha]^{25} = +189.5°$ (ethanol).

(b) (−) 2-(2-aminoethyl) - 1 - phenylisoindoline.—To a solution of 17.4 g. (0.073 mole) of 2-(2-aminoethyl)-1-phenylisoindoline in 20 ml. of methanol there was added a solution of 26.2 g. (0.073 mole) of (−) dibenzoyl-D-tartaric acid in 30 ml. of methanol. Addition of 300 ml. of ethyl acetate and 50 ml. of ether produced 24.5 g. of a crystalline precipitate which was collected. The filtrate was concentrated in vacuo, dissolved in aqueous sodium hydroxide and extracted with ether. The ether layer was dried and concentrated to give a brown oil, which was dissolved in 250 ml. of ethyl acetate. To this solution was added a solution of 13 g. (0.0353 mole) of (+) dibenzoyl-L-tartaric acid ($[\alpha]_D^{25} = +110.3°$ [methanol]) in 20 ml. of methanol. Addition of ether gave a crystalline precipitate which was collected. Six recrystallizations from mixtures of methanol, ethyl acetate and ether gave batches with the following rotations: $[\alpha]_D^{25} = +24.5°$, +18.2°, +8.7°, +7.6°, +6.9° (in methanol). A last recrystallization from a mixture of methanol and ethyl acetate gave white prisms melting at 162–167° (dec.), $[\alpha]_D^{20} = 6.7°$ (in methanol). The base was freed with aqueous sodium hydroxide, extracted with ether and distilled at 0.1 mm. and 100–125° (bath temperature). A colorless oil was obtained which crystallized on scratching to give white prisms melting at 68–71° $[\alpha]_D^{20} = -187.1°$ (in ethanol).

EXAMPLE 4

Preparation of 2-(3-aminopropyl)-1-phenylisoindoline hydrochloride

A solution of 10.7 g. of 2-hydroxymethylbenzhydrol in 35 ml. of thionyl chloride was heated on a steam bath for 45 minutes. The excess of thionyl chloride was removed in vacuo to give 11.3 g. of a yellow oil. A solution of 6.3 g. of this crude product in 55 ml. of benzene was added to 20 ml. of 1,3-diaminopropane, kept at 25° for 17 hours and heated on a steam bath for 2 hours. The mixture was concentrated in vacuo and the residue was partitioned in ether and 2 N aqueous sodium hydroxide. The ether phase was dried and concentrated. The residue was distilled at 0.1 mm. and 120–160° (bath temperature) to give a colorless oil which was dissolved in ether. Addition of ethereal hydrogen chloride gave a crystalline precipitate which on recrystallization from a mixture of ethanol and ether gave white prisms melting at 211–213°.

EXAMPLE 5

Preparation of 2-(2-aminoethyl)-6-chloro-1-phenylisoindoline hydrochloride

A solution of 9 g. of 3-chloro-6-(hydroxymethyl)benzhydrol in 30 ml. of thionyl chloride was heated on a steam bath for 1 hour and kept at 25° for 1 hour. The excess of thionyl chloride was removed in vacuo and the residue was dissolved in 75 ml. of benzene. This solution was added to 25 ml. of ethylenediamine. The temperature rose to 38°. The mixture was stirred at 25° for 2 hours and concentrated in vacuo. The residue was dissolved in ether, washed with water, dried and concentrated. Distillation at 0.3 mm. and 150° (bath temperature) gave a yellow oil which was dissolved in methylene chloride. Addition of ethanolic hydrogen chloride and ether gave a white precipitate which on recrystallization from a mixture of methylene chloride and ether gave white needles melting at 166–174°.

EXAMPLE 6

Preparation of 2-(2-aminoethyl)-1-(p-methoxyphenyl) isoindoline maleate

A solution of 10.6 g. of 2-hydroxymethyl-4'-methoxybenzhydrol in 35 ml. of thionyl chloride was refluxed for 40 minutes and kept at 25° for 1 hour. The excess of thionyl chloride was removed in vacuo, the residue was dissolved in benzene and added to 30 ml. of ethylenediamine. The temperature rose to 35°, the mixture was cooled to 25°, kept at that temperature for 1 hour and concentrated in vacuo. The residue was dissolved in ether, washed with water, and extracted with dilute hydrochloric acid. The aqueous phase was made alkaline, extracted with ether and distilled at 0.25 mm. and 150–155° bath temperature to give a yellow oil. This product was dissolved in methanol and a methanolic solution of maleic acid was added. Addition of ether gave a precipitate which after recrystallization from a mixture of methanol and ether gave white needles melting at 164–165° (dec.).

EXAMPLE 7

Preparation of 2-[4-(aminomethyl)cyclohexylmethyl]-1-phenylisoindoline

A solution of 17 g. of crude 2-bromomethylbenzhydryl bromide in 68 ml. of benzene was added to 71 ml. of 1,4-bis-(aminomethyl)cyclohexane. The temperature rose to 65°. After standing at 25° the mixture was diluted with 200 ml. of benzene and washed with water. The benzene solution was dried and concentrated to give a crystalline residue which was washed with boiling petroleum ether and collected. The product was dissolved in 100 ml. of hot ethanol, and filtered from the insoluble part. The filtrate was concentrated and the residue was recrystallized from ether to give 4.2 g. of white prisms melting at 135–137°.

EXAMPLE 8

Preparation of 2-(4-aminobutyl)-1-phenylisoindoline

A solution of 19.6 g. of crude 2-bromomethylbenzhydryl bromide in 100 ml. of benzene was poured into 44 ml. of 1,4-diaminobutane. The temperature rose to 62°. The mixture was diluted with 50 ml. of benzene and kept at 25° for 17 hours. Another 50 ml. of benzene was added and the solution was washed with water, dried and concentrated. The oily residue was dissolved in 25 ml. of methanol and a solution of 5.25 g. of maleic acid in 40 ml. of methanol was added. On addition of 50 ml. of ether a precipitate was obtained which was collected after 1 hour. Recrystallization from a mixture of methanol and ether gave 9.9 g. of light green prisms melting at 156–159°. The base was freed with aqueous sodium hydroxide, extracted with methylene chloride which was concentrated. Distillation at 0.2 mm. and 140–160° (bath temperature) gave a colorless oil which crystallized on scratching to give the product melting at 32–37°.

EXAMPLE 9

Preparation of 2-(2-amino-2-methylpropyl)-1-phenylisoindoline dihydrochloride

A solution of 17 g. of crude 2-bromomethylbenzhydryl bromide in 85 ml. of benzene was added to 44 ml. of 1,2-diamino-2-methylpropane. The temperature rose to 45°. The mixture was kept at 25° for 17 hours, diluted with benzene and washed with water and concentrated in vacuo. The residual oil was dissolved in 40 ml. of ethanol and an ethereal solution of hydrogen chloride was added. A precipitate was collected and washed with ether. Recrystallizations from mixtures of methanol and ether gave white prisms melting at 230–243° (dec.).

EXAMPLE 10

Preparation of 2-(2-aminopropyl)-1-phenylisoindoline maleate

A solution of 17 g. of crude 2-bromomethylbenzhydryl bromide in 85 ml. of benzene was added to 40 ml. of 1,2-diaminopropane. The temperature of the solution rose to 60°. The mixture was kept at 25° for 1 hour, diluted with 100 ml. of benzene and washed with water, dried and concentrated in vacuo. The residual oil was dissolved in ether and the base was extracted with 2 N aqueous hydrochloric acid. The acidic phase was basified and extracted with ether. This extract gave a yellow oil which was dissolved in 20 ml. of methylene chloride. A solution of 4.3 g. of maleic acid in 5 ml. of ethanol was added and on addition of ether a crystalline precipitate was formed. Recrystallization from a mixture of methanol and ether gave white prisms melting at 196–199° (dec.).

EXAMPLE 11

Preparation of 2-(2-aminoethyl)-1-(p-hydroxyphenyl) isoindoline dihydrobromide

The base was freed from 1 g. of 2-(2-aminoethyl)-1-(p-methoxyphenyl)isoindoline maleate with aqueous sodium hydroxide. Extraction with ether gave a colorless oil which was dissolved in 5 ml. of 48 percent aqueous hydrobromic acid and heated to 100° for 17 hours. The mixture was cooled and the precipitate was collected and washed with a mixture of ethanol and ether. Recrystallization from mixtures of methanol and ether gave white prisms melting at 267–272° (dec.).

The base, 2-(2-aminoethyl)-1-(p-hydroxyphenyl)isoindoline, was obtained from the dihydrobromide with aqueous ammonia. Recrystallization from a mixture of methylene chloride and petroleum ether gave white prisms melting at 178–182° (dec.).

EXAMPLE 12

Preparation of exemplary 2-hydroxymethylbenzhydrol intermediate (a) 2 - hydroxymethylbenzhydrol.—A suspension of 44.5 g. (1.17 mole) of lithium aluminum hydride in 1000 ml. of tetrahydrofuran was stirred in an ice bath. Small portions of a total of 160.4 g. (0.71 mole) of o-benzoylbenzoic acid were added in the course of 30 minutes. The mixture was stirred at 25° for 1 hour. The flask was cooled and 1700 ml. of ether followed by 160 ml. of water was added slowly. The mixture was stirred at 25° for 30 minutes and filtered through a pad of Hy-flo. The clear filtrate was concentrated to an oil which crystallized on scratching.

(b) 3-chloro - 6 - (hydroxymethyl)benzhydrol.—A solution of 75 g. (0.29 mole) of 2 - benzoyl - 4 - chlorobenzoic acid in 130 ml. of thionyl chloride was refluxed on a steam bath for 1 hour. The solution was concentrated in vacuo and a mixture of 75 ml. of pyridine and 150 ml. of methanol was added slowly to the cooled residue. The solution was kept at 25° for 17 hours, diluted with 500 ml. of benzene and washed with water. The benzene layer was dried and concentrated to give a crystalline residue which after recrystallization from a mixture of ether and petroleum ether gave white prisms of 5-chloro - 3 - methoxy - 3 - phenylphthalide melting at 72–74°.

A solution of 23 g. (0.094 mole) of 5 - chloro-3-methoxy - 3 - phenylphthalide, prepared as above, in 250 ml. of ether was added dropwise in the course of 45 minutes to a refluxing suspension of 4.75 g. (0.125 mole) of lithium aluminum hydride in 350 ml. of ether. The mixture was refluxed for 17 hours, cooled and 25 ml. of water was added slowly. Filtration gave a clear solution which after evaporation of the solvent gave a crystalline residue. Recrystallization from a mixture of ether and petroleum ether gave white prisms of 3-chloro-6-(hydroxymethyl)benzhydrol melting at 106–109°.

(c) 4' - chloro - 2 - hydroxymethylbenzhydrol.—A suspension of 22.3 g. (0.588 mole) of lithium aluminum hydride in 500 ml. of tetrahydrofuran was cooled to 25°. A solution of 92 g. (0.35 mole) of 2-(4'-chlorobenzoyl)-benzoic acid in 900 ml. of ether was added in the course of 30 minutes. During that time the temperature was maintained at ca. 25° and the stirring was continued for 1½ hours. To this mixture was added 400 ml. of ether, then 88 ml. of water in small portions. After stirring for 30 minutes the mixture was filtered and the filtrate was concentrated. The residual oil crystallized on scratching and after recrystallization from a mixture of ether and petroleum ether gave white prisms of 4'-chloro-2-hydroxymethylbenzhydrol melting at 70–74°.

EXAMPLE 13

Preparation of 2-(3-hydroxypropyl)-1-phenylisoindoline

To a solution of 17 g. of crude 2-bromomethylbenzhydryl bromide in 150 ml. of benzene, there was added a solution of 86 ml. of 3-amino - 1 - propanol in 125 ml. of benzene and 50 ml. of ethyl acetate in the course of 2 minutes. The temperature was kept at 25° by outside cooling. The mixture was poured into ice water and extracted with benzene. The extract was washed with water, dried and concentrated in vacuo. The remaining oil gave white needles which on recrystallization from a mixture of methylene chloride and heptane melted at 82–84°.

EXAMPLE 14

Preparation of 2-(2-hydroxyethyl)-1-phenylisoindoline

To a solution of 17 g. of crude 2-bromomethylbenzhydryl bromide in 85 ml. of chloroform, there was added a solution of 30 ml. of ethanolamine in 50 ml. of chloroform during the course of 15 minutes. The temperature rose to 53°. After the mixture was stirred at 25° for 16 hours, it was diluted with water. The chloroform layer was separated, dried and concentrated. A yellow oil was obtained which was dissolved in 50 ml. of ethanol. This solution was poured into a solution of 4.5 g. of oxalic acid in 25 ml. of methanol. On addition of ether there were obtained crystals which after recrystallization from a mixture of methanol and ether melted at 123–126°.

EXAMPLE 15

Preparation of 2-(3-bromopropyl)-1-phenylisoindoline from o-bromobenzhydryl bromide 3-bromopropylamine was obtained from an aqueous basic solution of 2.4 g. of its hydrobromide by extraction with chloroform. This solution was dried and added to a solution of 3.4 g. of 2 - bromomethylbenzhydryl bromide in 5 ml. of benzene. Triethylamine (2.8 ml.) was added and the solution was kept at 25° for 16 hours. The clear solution was washed with water and dried. Concentration in vacuo gave an oil which crystallized on scratching. Recrystallization from a mixture of ethanol and water gave white needles melting at 66–67°.

EXAMPLE 16

Preparation of 2-(3-bromopropyl)-1-phenylisoindoline from 2-(3-hydroxypropyl)-1-phenylisoindoline A solution of 2.5 g. of 2 - (3 - hydroxypropyl)-1-phenylisoindoline in 30 ml. of 48 percent aqueous hydrobromic acid was refluxed for 16 hours, cooled and poured into ice cold sodium hydroxide. Extraction with methylene chloride gave a yellow oil which crystallized on standing. Recrystallization from ethanol gave white needles melting at 66–67°.

EXAMPLE 17

Preparation of 2-(3-aminopropyl)-1-phenylisoindoline from 2-(3-bromopropyl)-1-phenylisoindoline A solution of 0.5 g. of 2-(3-bromopropyl)-1-phenylisoindoline in 10 ml. of dimethylformamide was added to 15 ml. of liquid ammonia. The solution was kept at 25° for 16 hours during which time the main amount of ammonia was allowed to evaporate. The mixture was extracted with ether which in turn was extracted with hydrochloric acid which was made alkaline and extracted with methylene chloride. Evaporation of the solvent gave white prisms melting at 67–72°.

EXAMPLE 18

This example illustrates typical pharmaceutical formulations embodying the novel 2-(2-aminoalkyl)-1-phenylisoindoline derivatives of this invention.

TABLET FORMULATION

|  | Per tablet, mg. |
|---|---|
| 2-(2-aminoethyl)-1-phenylisoindoline | 10.0 |
| Lactose | 129.0 |
| Corn starch | 50.0 |
| Pregelatinized corn starch | 8.0 |
| Calcium stearate | 3.0 |
| Total weight | 200.0 |

Procedure (1) 2-(2-aminoethyl) - 1 - phenylisoindoline, lactose, corn starch and pregelatinized corn starch were mixed in a suitable mixer.

(2) The mix was passed through a Fitzpatrick Comminuting Machine fitted with No. 1A screen and with knives forward.

(3) The mixture was returned to the mixer and moistened with water to a thick paste. The moist mass was passed through a No. 12 screen, and the moist granules were dried on paper-lined trays at 110° F.

(4) The dried granules were returned to the mixer, and the calcium stearate was added and mixed well.

(5) The granules were compressed at a tablet weight of 200 mg. using standard concave punches having a diameter of 5/16 inch.

CAPSULE FORMULATION

|  | Per capsule, mg. |
|---|---|
| 2-(2-aminoethyl)-1-phenylisoindoline | 25.5 |
| Lactose | 159.5 |
| Corn starch | 30.0 |
| Talc | 5.0 |
| Total net weight | 220.0 |

Procedure (1) 2-(2-aminoethyl)-1-phenylisoindoline, lactose and corn starch were mixed in a suitable mixer.

(2) The mixture was passed through a Fitzpatrick Comminuting Machine using a No. 1A screen and knives forward.

(3) The mixture was returned to the mixer and the talc added. It was blended well and filled into No. 4 two-piece, hard gelatin capsules on a Parke-Davis capsulating machine. (Any similar type capsulating machine may be used.)

PARENTERAL FORMULATION

This drug was prepared in duplex ampules, one containing the dry drug and the other containing the special diluent.

Dry fill ampul 5 cc., mg.
2-(2-aminoethyl)-1-phenylisoindoline _____ 20

A parenteral grade of the drug, fiber-free, was filled into the ampul using a Diehl Mater electric filler or other suitable type filler. The ampuls were sealed and sterilized at 255° F. for 2 hours.

Immediately before use the powder was solubilized with the following solution.

Special diluent 2 cc. per ml., mg.
Glacial acetic acid _____ 16
Sodium hydroxide, q.s. to pH _____ 3.0
Water for injection, q.s. to 1.0 ml.

In a suitable container under an atmosphere of nitrogen, the glacial acetic acid was dissolved in part of the water for injection. Sufficient sodium hydroxide was then added to adjust the pH to approximately 3.0. The solution was made to volume, filtered through an 02 Selas candle filter and filled into 2 cc. flint ampuls. The filling should be done under an atmosphere of nitrogen. The ampuls were sealed and sterilized at 212° F. for 30 minutes. The ampuls were then inspected, and those that leaked or contained fibers were discarded.

SUPPOSITORY FORMULATION

Per 1.3 gm. suppository, gm.
2-(2-aminoethyl)-1-phenylisoindoline _____ 0.025
Wecobee M [1] _____ 1.230
Carnauba wax _____ 0.045

[1] E. F. Drew Company, 522 5th Avenue, New York 10, N.Y.

Procedure (1) The Wecobee M and the carnauba wax were melted in a suitable size glass-lined container, mixed well and cooled to 45° C.

(2) 2-(2-aminoethyl)-1-phenylisoindoline, which had been reduced to a fine powder with no lumps, was stirred until completely and uniformly dispersed.

(3) The mixture was poured into suppository molds to yield suppositories having an individual weight of 1.3 gms.

(4) The suppositories were cooled and removed from molds. They were then individually wrapped in wax paper for packaging.

We claim:

1. A compound of the formula

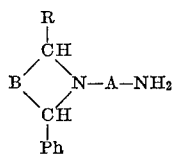

wherein B is o-phenylene or o-phenylene in which 1 to 4 of the hydrogen atoms have been replaced by a member independently selected from the group consisting of halogen, lower alkyl, lower alkoxy, hydroxy, amino and trifluoromethyl; A represents alkylene of 2 to 12 carbon atoms or alkylene of 2 to 12 carbon atoms in which part or all of the carbon atoms are in the form of a carbocycle of 3 to 7 carbon atoms; R is hydrogen or lower alkyl; and Ph represents phenyl or phenyl having 1 to 5 substituents independently selected from the group consisting of halogen, lower alkyl, lower alkoxy, hydroxy, amino and trifluoromethyl and pharmaceutically acceptable acid addition salts thereof.

2. A compound according to claim 1 wherein B is o-phenylene or a mono-substituted o-phenylene group and Ph represents phenyl or a mono-substituted phenyl group, i.e., a compound of the formula:

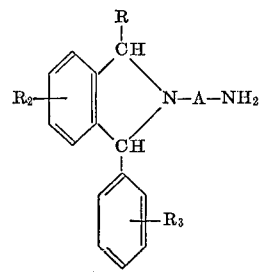

wherein A represents alkylene of 2 to 12 carbon atoms or alkylene of 2 to 12 carbon atoms in which part or all of the carbon atoms are in the form of a carbocycle of 3 to 7 carbon atoms; R is hydrogen or lower alkyl; and $R_2$ and $R_3$ are each independently selected from the group consisting of hydrogen, halogen, lower alkyl, lower alkoxy, hydroxy, amino and trifluoromethyl.

3. The compound according to claim 2 wherein A is cyclohexyldimethylene and R, $R_2$ and $R_3$ are each hydrogen, i.e., the compound 2-[4-(aminomethyl)cyclohexylmethyl]-1-phenylisoindoline.

4. The compound according to claim 2 wherein A is butylene and R, $R_2$ and $R_3$ are each hydrogen, i.e., the compound 2-(4-aminobutyl)-1-phenylisoindoline.

5. The compound according to claim 2 wherein A is 2-methylpropylene and R, $R_2$ and $R_3$ are each hydrogen, i.e., the compound 2-(2-amino-2-methylpropyl)-1-phenylisoindoline.

6. A compound according to claim 2 wherein A represents an alkylene chain of 2 to 3 carbon atoms, i.e., a compound of the formula:

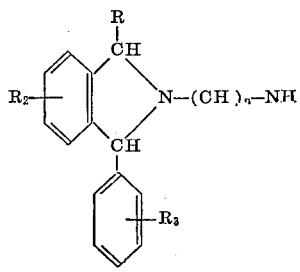

wherein R is hydrogen or lower alkyl; $R_2$ and $R_3$ are each independently selected from the group consisting of hydrogen, halogen, lower alkyl, lower alkoxy, hydroxy, amino and trifluoromethyl; and $n$ is an integer from 2 to 4 and pharmaceutically acceptable acid addition salts thereof.

7. The compound according to claim 6 wherein $n$ is 3 and R, $R_2$ and $R_3$ are each hydrogen, i.e., the compound 2-(3-aminopropyl)-1-phenylisoindoline.

8. The compound according to claim 6 wherein $n$ is 3 and R, $R_2$ and $R_3$ are each hydrogen, i.e., the compound 2-(3-aminopropyl)-1-phenylisoindoline.

9. A compound according to claim 2 wherein $n$ is 2 and R is hydrogen, i.e., a compound of the formula:

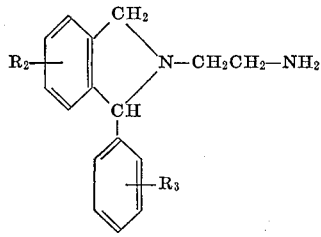

wherein $R_2$ and $R_3$ are each independently selected from the group consisting of hydrogen, halogen, lower alkyl, lower alkoxy, hydroxy, amino and trifluoromethyl.

10. The compound according to claim 9 wherein $R_2$ and R₃ are each hydrogen, i.e., the compound 2-(2-aminoethyl)-1-phenylisoindoline.

11. The dextrorotatory enantiomer of the compound of claim 9, i.e., (+)-2-(2-aminoethyl) - 1 - phenylisoindoline.

12. The levorotatory enantiomer of the compound of claim 9, i.e., (—)-2-(2-aminoethyl)-1-phenylisoindoline.

13. The compound according to claim 9 wherein R₂ is chloro and is in 6-position and R₃ is hydrogen, i.e, the compound (2 - (2 - aminoethyl)-6-chloro-1-phenylisoindoline.

14. The compound according to claim 9 wherein R₃ is methoxy and is in 4'-position and R₂ is hydrogen, i.e., the compound 2-(2-aminoethyl) - 1-(4'-methoxyphenyl) isoindoline.

15. The compound according to claim 9 wherein R₃ is hydroxy and is in 4'-position and R₂ is hydrogen, i.e., the compound 2 - (2-aminoethyl)-1-(4'-hydroxyphenyl) isoindoline.

16. A compound of the formula:

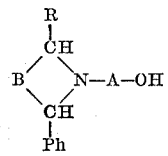

wherein B is o-phenylene or o-phenylene in which 1 to 4 of the hydrogen atoms have been replaced by a member independently selected from the group consisting of halogen, lower alkyl, lower alkoxy, hydroxy, amino, and trifluoromethyl; A represents alkylene of 2 to 12 carbon atoms or alkylene of 2 to 12 carbon atoms in which part or all of the carbon atoms are in the form of a carbocycle of 3 to 7 carbon atoms; R is hydrogen or lower alkyl; and Ph represents phenyl or phenyl having 1 to 5 substituents independently selected from the group consisting of halogen, lower alkyl, lower alkoxy, hydroxy, amino and trifluoromethyl.

17. A compound according to claim 16 wherein A is ethylene or propylene, i.e., a compound of the formula:

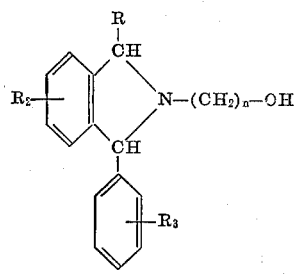

wherein R is hydrogen or lower alkyl; R₂ and R₃ are each independently selected from the group consisting of hydrogen, halogen, lower alkyl, lower alkoxy, hydroxy, amino and trifluoromethyl; and $n$ is an integer from 2 to 4.

18. The compound according to claim 17 wherein $n$ is 2 and R, R₂ and R₃ are each hydrogen, i.e., the compound 2-(2-hydroxyethyl)-1-phenylisoindoline.

19. The compound according to claim 17 wherein $n$ is 3 and R, R₂ and R₃ are each hydrogen, i.e., the compound 2-(3-hydroxypropyl)-1-phenylisoindoline.

20. A compound of the formula:

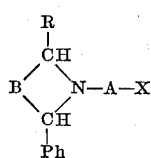

wherein B is o-phenylene or o-phenylene in which 1 to 4 of the hydrogen atoms have been replaced by a member independently selected from the group consisting of halogen, lower alkyl, lower alkoxy, hydroxy, amino and trifluoromethyl; A represents alkylene of 2 to 12 carbon atoms or alkylene of 2 to 12 carbon atoms in which part or all of the carbon atoms are in the form of a carbocycle of 3 to 7 carbon atoms; R is hydrogen or lower alkyl; Ph represents phenyl or phenyl having 1 to 5 substituents independently selected from the group consisting of halogen, lower alkyl, lower alkoxy, hydroxy, amino and trifluoromethyl; and X is halogen.

21. A compound according to claim 20 wherein A is ethylene or propylene, i.e., a compound of the formula:

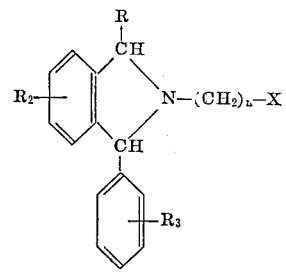

wherein R is hydrogen or lower alkyl; R₂ and R₃ are each independently selected from the group consisting of hydrogen, halogen, lower alkyl, lower alkoxy, hydroxy, amino and trifluoromethyl; $n$ is an integer from 2 to 4; and X is halogen.

22. A compound of the formula

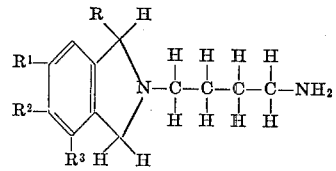

wherein
each of R¹, R², and R³ is, independently, a member selected from the group consisting of a hydrogen atom, methyl, ethyl, propyl and butyl; and
R is a member selected from the group consisting of unsubstituted phenyl and phenyl substituted in at least one of the positions 3-, 4- and 5- with at least one substituent selected from the group consisting of methyl, ethyl, propyl, chloro, and fluoro; and the pharmaceutically acceptable acid addition salts thereof.

23. A compound of the formula:

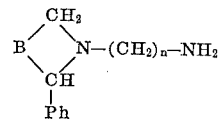

wherein B is o-phenylene or o-phenylene in which 1 to 4 of the hydrogen atoms have been replaced by a member independently selected from the group consisting of halogen, lower alkyl, lower alkoxy, hydroxy, amino and trifluoromethyl; Ph represents phenyl or phenyl having 1 to 5 substituents independently selected from the group consisting of halogen, lower alkyl, lower alkoxy, hydroxy, amino and trifluoromethyl; and $n$ is an integer from 2 to 4.

24. A compound of the formula:

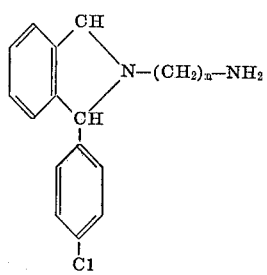

wherein $n$ is an integer from 2 to 4.

25. A compound of the formula

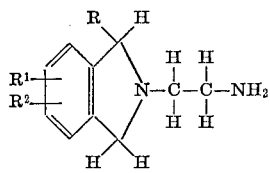

wherein R is selected from the group consisting of phenyl, monohalophenyl, dihalophenyl, mono(lower)alkylphenyl, di(lower)alkylphenyl, trifluoromethylphenyl, mono(lower(alkoxyphenyl and di(lower) alkoxyphenyl; $R^1$ is selected from the group consisting of hydrogen, amino, halogen, lower alkyl and lower alkoxy; $R^2$ is hydrogen when $R^1$ and $R^2$ are dissimilar and when $R^1$ and $R^2$ are the same, they are selected from the group consisting of hydrogen, halogen, lower alkyl and lower alkoxy, and pharmaceutically acceptable acid addition salts thereof.

26. A compound of the formula:

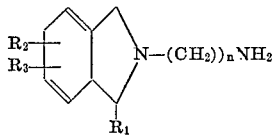

wherein $R_1$ is selected from the group consisting of phenyl, monohalophenyl, dihalophenyl, mono(lower)alkylphenyl, di(lower)alkylphenyl, trifluoromethylphenyl, mono(lower)alkoxyphenyl and di(lower)alkoxyphenyl; $R_2$ is selected from the group consisting of hydrogen, amino, halogen, lower alkyl and lower alkoxy; $R_3$ is hydrogen when $R_2$ and $R_3$ are dissimilar and when $R_2$ and $R_3$ are the same they are both selected from the group consisting of hydrogen, halogen, lower alkyl and lower alkoxy; $n$ is an integer from 2 to 7;

and the pharmaceutically acceptable acid addition salts thereof.

References Cited

UNITED STATES PATENTS

| | | | |
|---|---|---|---|
| 3,031,458 | 4/1962 | Huebner | 260—326.1 |
| 3,072,530 | 1/1963 | Hofmann et al. | 167—65 |

ALEX MAZEL, Primary Examiner

J. A. NARCAVAGE, Assistant Examiner

U.S. Cl. X.R.

260—571, 613, 618, 619, 623; 424—274

PO-1050
(5/69)

UNITED STATES PATENT OFFICE
CERTIFICATE OF CORRECTION

Patent No. 3,558,649        Dated January 26, 1971

Inventor(s) Werner Metlesics and Leo Henryk Sternbach

It is certified that error appears in the above-identified patent and that said Letters Patent are hereby corrected as shown below:

Column 12, line 40, claim 6

"$N-(CH)_n-NH$"        should be $N-(CH_2)_n-NH_2$

Column 12, line 58, claim 8

"2-(3-aminopropyl)-"        should be 2-(2-aminopropyl)-

Column 15, lines 11 and 12, claim 25

"mono(lower(alkoxyphenyl"        should be mono(lower)alkoxyphenyl

Column 16, line 14, insert

27. The compound according to claim 21 wherein n is 3; X is bromo; and R, $R_2$ and $R_3$ are each hydroge i.e., the compound 2-(3-bromopropyl)-1-phenylisoindo:

In the heading to the printed specification, line 10, "26 Claims" should read -- 27 Claims --.

Signed and sealed this 21st day of September 1971.

(SEAL)
Attest:

EDWARD M. FLETCHER, JR.        ROBERT GOTTSCHALK
Attesting Officer              Acting Commissioner of Pat